(12) United States Patent
Uehara et al.

(10) Patent No.: US 9,318,760 B2
(45) Date of Patent: Apr. 19, 2016

(54) FUEL CELL AND METHOD OF OPERATING FUEL CELL

(71) Applicant: HONDA MOTOR CO., LTD., Tokyo (JP)

(72) Inventors: Junji Uehara, Wako (JP); Masahiro Mohri, Wako (JP); Hiromichi Yoshida, Wako (JP); Kenichiro Ueda, Wako (JP); Shinya Watanabe, Wako (JP); Akiji Ando, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 234 days.

(21) Appl. No.: 14/010,529

(22) Filed: Aug. 27, 2013

(65) Prior Publication Data
US 2014/0057186 A1 Feb. 27, 2014

(30) Foreign Application Priority Data
Aug. 27, 2012 (JP) .................................. 2012-186734

(51) Int. Cl.
*H01M 8/04* (2006.01)
*H01M 8/02* (2006.01)
*H01M 8/10* (2006.01)

(52) U.S. Cl.
CPC ...... *H01M 8/04835* (2013.01); *H01M 8/04126* (2013.01); *H01M 8/04544* (2013.01); *H01M 8/04559* (2013.01); *H01M 2008/1095* (2013.01); *H01M 2250/20* (2013.01); *Y02E 60/50* (2013.01); *Y02T 90/32* (2013.01)

(58) Field of Classification Search
CPC H01M 8/04; H01M 8/04559; H01M 8/04835
See application file for complete search history.

(56) References Cited

U.S. PATENT DOCUMENTS

| 7,695,845 B2 | 4/2010 | Sugita et al. | |
| 2002/0150802 A1* | 10/2002 | Imamura | H01M 8/04007 429/413 |
| 2008/0093752 A1* | 4/2008 | Jeon | B01D 63/02 261/100 |
| 2008/0311449 A1* | 12/2008 | Kaito | H01M 8/04365 429/410 |

(Continued)

FOREIGN PATENT DOCUMENTS

| JP | 2000-251913 | 9/2000 |
| JP | 2002-184438 | 6/2002 |
| JP | 2003-178778 | 6/2003 |

(Continued)

OTHER PUBLICATIONS

Japanese Office Action for corresponding JP Application No. 2012-186734, Oct. 27, 2015.

*Primary Examiner* — Kenneth Douyette
(74) *Attorney, Agent, or Firm* — Mori & Ward, LLP

(57) ABSTRACT

In a method of operating a fuel cell, a voltage difference between voltages of a first unit cell and a second unit cell is detected. Whether the voltage difference is out of a predetermined range is determined. If the voltage difference is determined to be out of the predetermined range, humidity of a first reactant gas before being supplied to a first reactant gas passage is adjusted or humidity of a second reactant gas before being supplied to a second reactant gas passage is adjusted. The first reactant gas passage is provided in a first separator. The first reactant gas is to be supplied to one of first electrodes through the first reactant gas passage. The second reactant gas is to be supplied to another of the first electrodes through the second reactant gas passage.

10 Claims, 6 Drawing Sheets

(56) References Cited

U.S. PATENT DOCUMENTS

2009/0191437 A1* 7/2009 Maeshima ........ H01M 8/04029
429/434
2010/0237278 A1* 9/2010 Kim ....................... H01B 1/122
252/182.3

FOREIGN PATENT DOCUMENTS

| JP | 2007-035493 | 2/2007 |
| JP | 2008-021448 | 1/2008 |
| JP | 2009-134996 | 6/2009 |
| JP | 2011-134530 | 7/2011 |

* cited by examiner

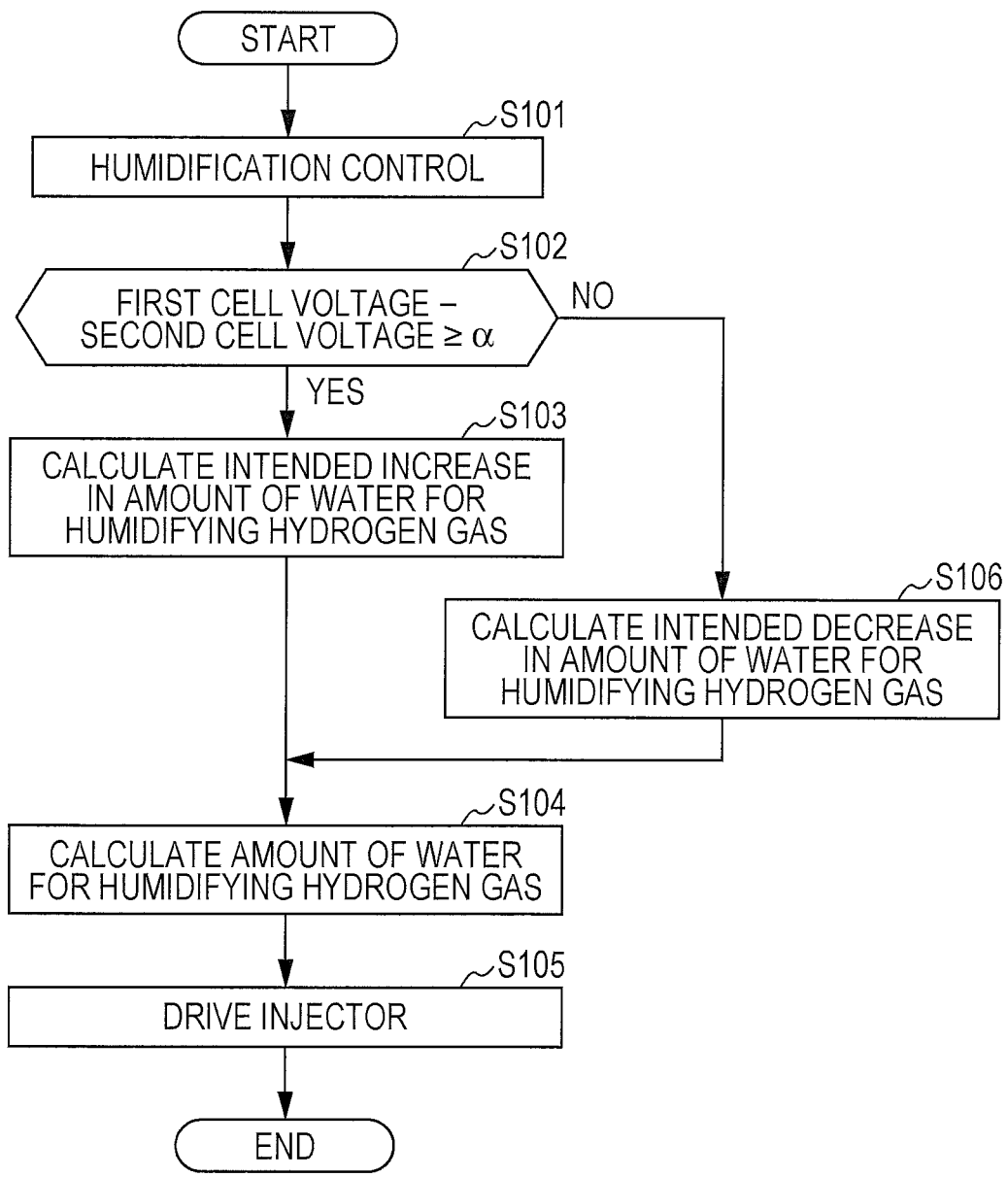

FUEL CELL AND METHOD OF OPERATING FUEL CELL

CROSS-REFERENCE TO RELATED APPLICATIONS

The present application claims priority under 35 U.S.C. §119 to Japanese Patent Application No. 2012-186734, filed Aug. 27, 2012, entitled "Method of Operating Fuel Cell." The contents of this application are incorporated herein by reference in their entirety.

BACKGROUND

1. Field

The present disclosure relates to a fuel cell and a method of operating the fuel cell.

2. Description of the Related Art

For example, a solid polymer electrolyte fuel cell forms a unit cell, in which an membrane electrode assembly (MEA) is sandwiched between a pair of separators, the membrane electrode assembly being formed by disposing an anode electrode and a cathode electrode on respective sides of an electrolyte membrane which is a polymer ion exchange membrane.

In the unit cell, a fuel gas passage for supplying a fuel gas to the anode electrode is formed between one of the separators and the membrane electrode assembly, and an oxidant gas passage for supplying an oxidant gas to the cathode electrode is formed between the other of the separators and the membrane electrode assembly. In addition, a cooling medium passage for circulating a cooling medium in the direction along a power generation surface is formed between separators which are adjacent to each other.

In the fuel cell, what is called a skip cooling structure, in which a cooling medium passage is provided for each group of multiple unit cells, may be adopted (Japanese Unexamined Patent Application Publication No. 2009-134996). Consequently, decreased number of cooling medium passages allows the number of separators to be reduced, and thus the entire fuel cell stack in the stacking direction can be reduced in size.

SUMMARY

According to one aspect of the present invention, in a method of operating a fuel cell, a voltage difference between voltages of a first unit cell and a second unit cell is detected. The first unit cell includes a first membrane electrode assembly having a first electrolyte membrane and first electrodes provided on respective sides of the first electrolyte membrane. The second unit cell includes a second membrane electrode assembly having a second electrolyte membrane and second electrodes provided on respective sides of the second electrolyte membrane. Whether the voltage difference is out of a predetermined range is determined. If the voltage difference is determined to be out of the predetermined range, humidity of a first reactant gas before being supplied to a first reactant gas passage is adjusted or humidity of a second reactant gas before being supplied to a second reactant gas passage is adjusted. The first reactant gas passage is provided in a first separator. The first reactant gas is to be supplied to one of the first electrodes through the first reactant gas passage. The second reactant gas is to be supplied to another of the first electrodes through the second reactant gas passage.

According to another aspect of the present invention, a fuel cell includes a first membrane electrode assembly, a second membrane electrode assembly, a first separator, a second separator, a third separator, and a controller. The first membrane electrode assembly includes a first electrolyte membrane and first electrodes provided on respective sides of the first electrolyte membrane. The second membrane electrode assembly includes a second electrolyte membrane and second electrodes provided on respective sides of the second electrolyte membrane. The first separator is adjacent to the first membrane electrode assembly and includes a first reactant gas passage through which a first reactant gas is to be supplied to one of the first electrodes of the first membrane electrode assembly. The second separator is disposed between the first membrane electrode assembly and the second membrane electrode assembly and includes a second reactant gas passage and a third reactant gas passage. A second reactant gas is to be supplied to another of the first electrodes of the first membrane electrode assembly through the second reactant gas passage. The first reactant gas is to be supplied to one of the second electrodes of the second membrane electrode assembly through the third reactant gas passage. The third separator is adjacent to the second membrane electrode assembly and includes a fourth reactant gas passage and a cooling medium passage. The second reactant gas is to be supplied to another of the second electrodes of the second membrane electrode assembly through the fourth reactant gas passage. A cooling medium is to be supplied between the third separator and the first separator through the cooling medium passage. The controller is configured to detect a voltage difference between voltages of a first unit cell and a second unit cell. The first unit cell includes the first membrane electrode assembly. The second unit cell includes the second membrane electrode assembly. The controller is configured to determine whether the voltage difference is out of a predetermined range. The controller is configured to adjust, if the voltage difference is determined to be out of the predetermined range, humidity of the first reactant gas before being supplied to the first reactant gas passage or humidity of the second reactant gas before being supplied to the second reactant gas passage.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 6 is a flowchart illustrating the operating method.

DESCRIPTION OF THE EMBODIMENTS

Figure 1:
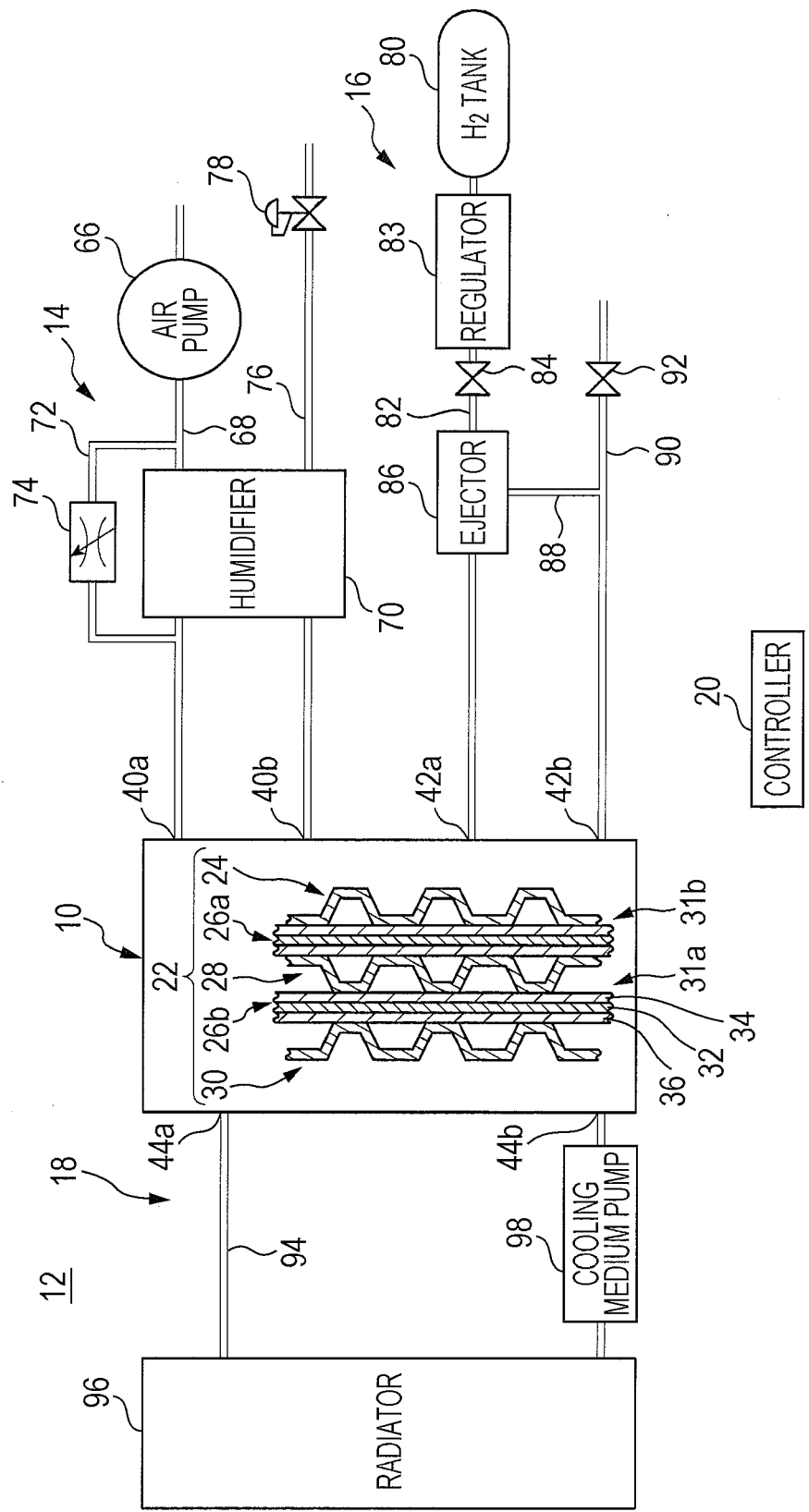
FIG. 1 is a schematic configuration diagram of a fuel cell system to which an operating method according to a first embodiment of the present disclosure is applied.

The embodiments will now be described with reference to the accompanying drawings, wherein like reference numerals designate corresponding or identical elements throughout the various drawings.

As illustrated in FIG. 1, a fuel cell 10, to which the operating method according to a first embodiment of the present disclosure is applied, is incorporated in an in-vehicle fuel cell system 12 mounted in, for example, a fuel cell electric vehicle.

The fuel cell system 12 includes an oxidant gas supply device 14 which supplies an oxidant gas (hereinafter referred to as an air) to the fuel cell 10, a fuel gas supply device 16 which supplies a fuel gas (hereinafter referred to as a hydrogen gas) to the fuel cell 10, a cooling medium supply device 18 which supplies a cooling medium to the fuel cell 10, and a controller 20 which controls the entire fuel cell system 12.

Figure 2:
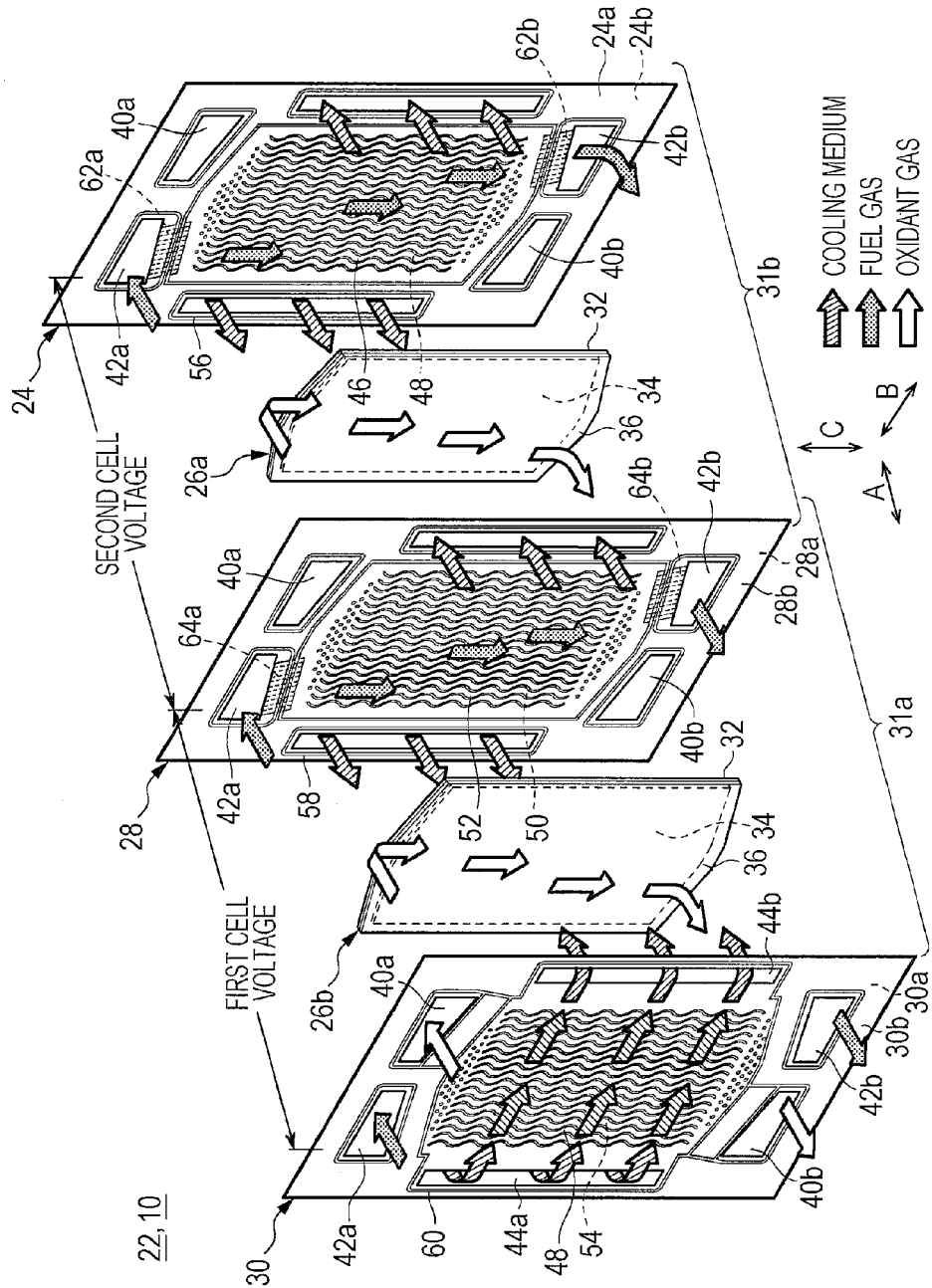
FIG. 2 is an exploded perspective view of the main part of a fuel cell included in the fuel cell system.

As illustrated in FIG. 2, the fuel cell 10 includes a plurality of cell units 22 which are stacked in a horizontal direction (the direction of arrow A) or in the gravity direction (the direction of arrow C). The cell unit 22 is provided with a first separator 24, a first membrane electrode assembly (MEA) 26a, a second separator 28, a second membrane electrode assembly (MEA) 26b, and a third separator 30.

The second separator 28, the second membrane electrode assembly 26b, and the third separator 30 constitute a first unit cell 31a. The first separator 24, the first membrane electrode assembly 26a, and the second separator 28 constitute a second unit cell 31b.

The first separator 24, the second separator 28, and the third separator 30 are, for example, formed by a steel sheet, a stainless steel sheet, an aluminum sheet, a plated steel sheet, or a metal sheet having a surface treatment for protection against corrosion. The first separator 24, the second separator 28, and the third separator 30 are formed by stamping a thin metal sheet into a corrugated pattern so as to have a corrugated cross section. It is to be noted that e.g., a carbon separator instead of a metal separator may be used for the first separator 24, the second separator 28, and the third separator 30.

The first membrane electrode assembly 26a and the second membrane electrode assembly 26b each include, for example, a solid polymer electrolyte membrane 32 which is a thin perfluoro sulfonic acid membrane impregnated with water, and a cathode electrode 34 and an anode electrode 36 between which the solid polymer electrolyte membrane 32 is sandwiched.

The anode electrode 34 forms what is called a stepped MEA in which a planar dimension of the anode electrode 34 is smaller than the planar dimensions of the solid polymer electrolyte membrane 32 and cathode electrode 36. It is to be noted that the anode electrode 34 and the cathode electrode 36 may have the same planar dimension. The solid polymer electrolyte membrane 32, the anode electrode 34, and cathode electrode 36 are each provided with notches at upper and lower portions of both ends in the direction of arrow B, however, the configuration is not limited to this.

The anode electrode 34 and cathode electrode 36 have a gas diffusion layer (not illustrated) which is composed of carbon paper or the like, and an electrode catalyst layer (not illustrated) which is formed by uniformly coating the surface of the gas diffusion layer with porous carbon particles which carry platinum alloy on the surfaces thereof. The electrode catalyst layer is formed on both sides of the solid polymer electrolyte membrane 32.

The upper end of the cell unit 22 in the direction of the longer side (the direction of the arrow C) is provided with an oxidant gas inlet communication hole 40a for supplying an oxidant gas, for example, an oxygen containing gas (such as air), and a fuel gas inlet communication hole 42a for supplying a fuel gas, for example, a hydrogen containing gas (such as hydrogen gas), each hole communicating through the separators in the direction of the arrow A.

The lower end of the cell unit 22 in the direction of the longer side (the direction of the arrow C) is provided with a fuel gas outlet communication hole 42b for discharging a fuel gas, and an oxidant gas outlet communication hole 40b for discharging an oxidant gas, each hole communicating through the separators in the direction of the arrow A.

One end of the cell unit 22 in the direction of the shorter side (the direction of the arrow B) is provided with a cooling medium inlet communication holes 44a for supplying a cooling medium, the hole communicating through the separators in the direction of the arrow A. The other end of the cell unit 22 in the direction of the shorter side is provided with a cooling medium outlet communication hole 44b for discharging a cooling medium.

In a surface 24a of the first separator 24 that faces the first membrane electrode assembly 26a, a first fuel gas passage 46 is formed which allows the fuel gas inlet communication hole 42a to communicate with the fuel gas outlet communication hole 42b. The first fuel gas passage 46 has a plurality of wavy passage grooves which extend in the direction of the arrow C.

In a surface 24b of the first separator 24, part of a cooling medium passage 48 is formed which allows the cooling medium inlet communication holes 44a to communicate with the cooling medium outlet communication hole 44b. The part of the cooling medium passage 48 is formed at the back side of the first fuel gas passage 46.

In a surface 28a of the second separator 28 that faces the first membrane electrode assembly 26a, a first oxidant gas passage 50 is formed which allows the oxidant gas inlet communication hole 40a to communicate with the oxidant gas outlet communication hole 40b. The first oxidant gas passage 50 has a plurality of wavy passage grooves which extend in the direction of the arrow C. In a surface 28b of the second separator 28 that faces the second membrane electrode assembly 26b, a second fuel gas passage 52 is formed which allows the fuel gas inlet communication hole 42a to communicate with the fuel gas outlet communication hole 42b. The second fuel gas passage 52 has a plurality of wavy passage grooves which extend in the direction of the arrow C.

In a surface 30a of the third separator 30 that faces the second membrane electrode assembly 26b, a second oxidant gas passage 54 is formed which allows the oxidant gas inlet communication hole 40a to communicate with the oxidant gas outlet communication hole 40b. The second oxidant gas passage 54 has a plurality of wavy passage grooves which extend in the direction of the arrow C. In a surface 30b of the third separator 30, part of the cooling medium passage 48 is formed which allows the cooling medium inlet communication holes 44a to communicate with the cooling medium outlet communication hole 44b. The cooling medium passage 48 is formed by overlapping the back (wavy form) side of the first fuel gas passage 46 and the second oxidant gas passage 54.

A first sealing member 56 is integrally molded with the surfaces 24a, 24b of the first separator 24 so as to surround the outer peripheral edge of the first separator 24. A second sealing member 58 is integrally molded with the surfaces 28a, 28b of the second separator 28 so as to surround the outer peripheral edge of the second separator 28, and a third sealing member 60 is integrally molded with the surfaces 30a, 30b of the third separator 30 so as to surround the outer peripheral edge of the third separator 30.

As the material for the first sealing member 56, the second sealing member 58, and the third sealing member 60, a sealing, cushioning or packing material having elasticity, such as EPDM, NBR, a fluoride rubber, a silicone rubber, a fluoro silicone rubber, a butyl rubber, a natural rubber, a styrene rubber, a chloroprene or acrylic rubber is used.

The first separator 24 is provided with an inlet side connection passage 62a which allows the fuel gas inlet communication hole 42a to communicate with the first fuel gas passage 46, and with an outlet side connection passage 62b which allows the fuel gas outlet communication hole 42b to communicate with the first the fuel gas passage 46.

The second separator 28 is provided with an inlet side connection passage 64a which allows the fuel gas inlet communication hole 42a to communicate with the second fuel gas passage 52, and with an outlet side connection passage 64b which allows the fuel gas outlet communication hole 42b to communicate with the second fuel gas passage 52.

As illustrated in FIG. 1, the oxidant gas supply device 14 includes an air pump 66 which compresses and supplies air from the atmosphere, and the air pump 66 is disposed in an air supply passage 68. The air supply passage 68 is provided with a humidifier 70 which exchanges water and heat between supply gas and discharge gas, and the air supply passage 68 communicates with the oxidant gas inlet communication hole 40a of the fuel cell 10. The air supply passage 68 is provided with a bypass passage 72 which bypasses the humidifier 70, and the bypass passage 72 is provided with a flow rate regulating valve 74.

The oxidant gas supply device 14 includes an air discharge passage 76 which communicates with the oxidant gas outlet communication hole 40b. The air discharge passage 76 communicates with a humidification medium passage (not illustrated) of the humidifier 70. The air discharge passage 76 is provided with an opening adjustable back pressure control valve 78 for adjusting the pressure of the air which is supplied to the fuel cell 10 from the air pump 66 through the air supply passage 68.

The fuel gas supply device 16 includes a hydrogen tank ($H_2$ tank) 80 which stores high pressure hydrogen. The hydrogen tank 80 communicates with the fuel gas inlet communication hole 42a of the fuel cell 10 via a hydrogen supply passage 82. The hydrogen supply passage 82 is provided with a regulator 83, a shut-off valve 84, and an ejector 86. A pressure of the regulator 83 is adjusted according to the pressure of the supplying oxidant gas in the oxidant gas supply device 14.

The ejector 86 supplies hydrogen gas which is supplied from the hydrogen tank 80 to the fuel cell 10 through the hydrogen supply passage 82, draws exhaust gas from a hydrogen circulation passage 88, the exhaust gas containing unused hydrogen gas which has not been consumed in fuel cell 10, and supplies the exhaust gas to the fuel cell 10 again.

The fuel gas outlet communication hole 42b communicates with an off-gas passage 90. The off-gas passage 90 communicates with the hydrogen circulation passage 88 on its way and is connected to a purge valve 92.

The cooling medium supply device 18 includes a cooling medium circulation passage 94 which communicates with the cooling medium inlet communication hole 44a and the cooling medium outlet communication hole 44b which are provided in the fuel cell 10, the cooling medium circulation passage 94 allowing a cooling medium to circulate through the fuel cell 10. The cooling medium circulation passage 94 is connected to a radiator 96 and a cooling medium pump 98.

The operation of the thus configured fuel cell system 12 will be described below.

First, as illustrated in FIG. 1, for example, air as an oxidant gas is supplied to the air supply passage 68 via the air pump 66 which constitutes the oxidant gas supply device 14. The air is humidified through the humidifier 70, then is supplied to the oxidant gas inlet communication hole 40a of the fuel cell 10.

As illustrated in FIG. 2, the air is introduced from the oxidant gas inlet communication hole 40a into the first oxidant gas passage 50 of the second separator 28 and the second oxidant gas passage 54 of the third separator 30. The air moves along the first oxidant gas passage 50 in the direction of the arrow C (gravity direction) and is supplied to the cathode electrode 36 of the first membrane electrode assembly 26a, and the air also moves along the second oxidant gas passage 54 in the direction of the arrow C and is supplied to the cathode electrode 36 of the second membrane electrode assembly 26b.

On the other hand, in the fuel gas supply device 16, as illustrated in FIG. 1, opening of the shut-off valve 84 causes hydrogen gas to be supplied to the hydrogen supply passage 82 from the hydrogen tank 80, the hydrogen gas being decompressed by the regulator 83. The hydrogen gas is supplied to the fuel gas inlet communication hole 42a of the fuel cell 10 through the hydrogen supply passage 82.

As illustrated in FIG. 2, the hydrogen gas is introduced from the fuel gas inlet communication hole 42a into the first fuel gas passage 46 through the inlet side connection passage 62a which is formed in the first separator 24. Thus, the hydrogen gas moves along the first fuel gas passage 46 in the gravity direction (the direction of the arrow C), and is supplied to the anode electrode 34 of the first membrane electrode assembly 26a.

The hydrogen gas is also introduced from the fuel gas inlet communication hole 42a into the second fuel gas passage 52 through the inlet side connection passage 64a which is formed in the second separator 28. Thus, the hydrogen gas moves along the second fuel gas passage 52 in the direction of the arrow C, and is supplied to the anode electrode 34 of the second membrane electrode assembly 26b.

Consequently, in the first membrane electrode assembly 26a and the second membrane electrode assembly 26b, the oxygen gas in the air supplied to the cathode electrode 36 and the hydrogen gas supplied to the anode electrode 34 are consumed by an electrochemical reaction in respective electrode catalyst layers, and thus electric power is generated.

Subsequently, the air which has been supplied to and consumed in the respective cathode electrodes 36 of the first membrane electrode assembly 26a and the second membrane electrode assembly 26b is discharged along the oxidant gas outlet communication hole 40b in the direction of the arrow A.

As illustrated in FIG. 1, consumed air is discharged from the oxidant gas outlet communication hole 40b into the air discharge passage 76, and is sent to the humidifier 70 which humidifies newly supplied air, and the consumed air is discharged to the outside via the back pressure control valve 78.

As illustrated in FIG. 2, the hydrogen gas which has been supplied to and consumed in the respective anode electrodes 34 of the first membrane electrode assembly 26a and the second membrane electrode assembly 26b is discharged to the fuel gas outlet communication hole 42b. As illustrated in FIG. 1, consumed hydrogen gas is drawn into the ejector 86 from the fuel gas outlet communication hole 42b via the hydrogen circulation passage 88, and is supplied to the fuel cell 10 as a fuel gas again.

On the other hand, in the cooling medium supply device 18, the operation of the cooling medium pump 98 causes a cooling medium to be introduced into the fuel cell 10 from the cooling medium circulation passage 94 through the cooling medium inlet communication hole 44a. As illustrated in FIG. 1, a cooling medium is introduced into the cooling medium passage 48 formed between the first separator 24 and the third separator 30, and circulates in the direction of the arrow B. The cooling medium, after cooling the first membrane electrode assembly 26a and the second membrane electrode assembly 26b, is discharged from the cooling medium outlet communication hole 44b into the cooling medium circulation passage 94.

Figure 3:
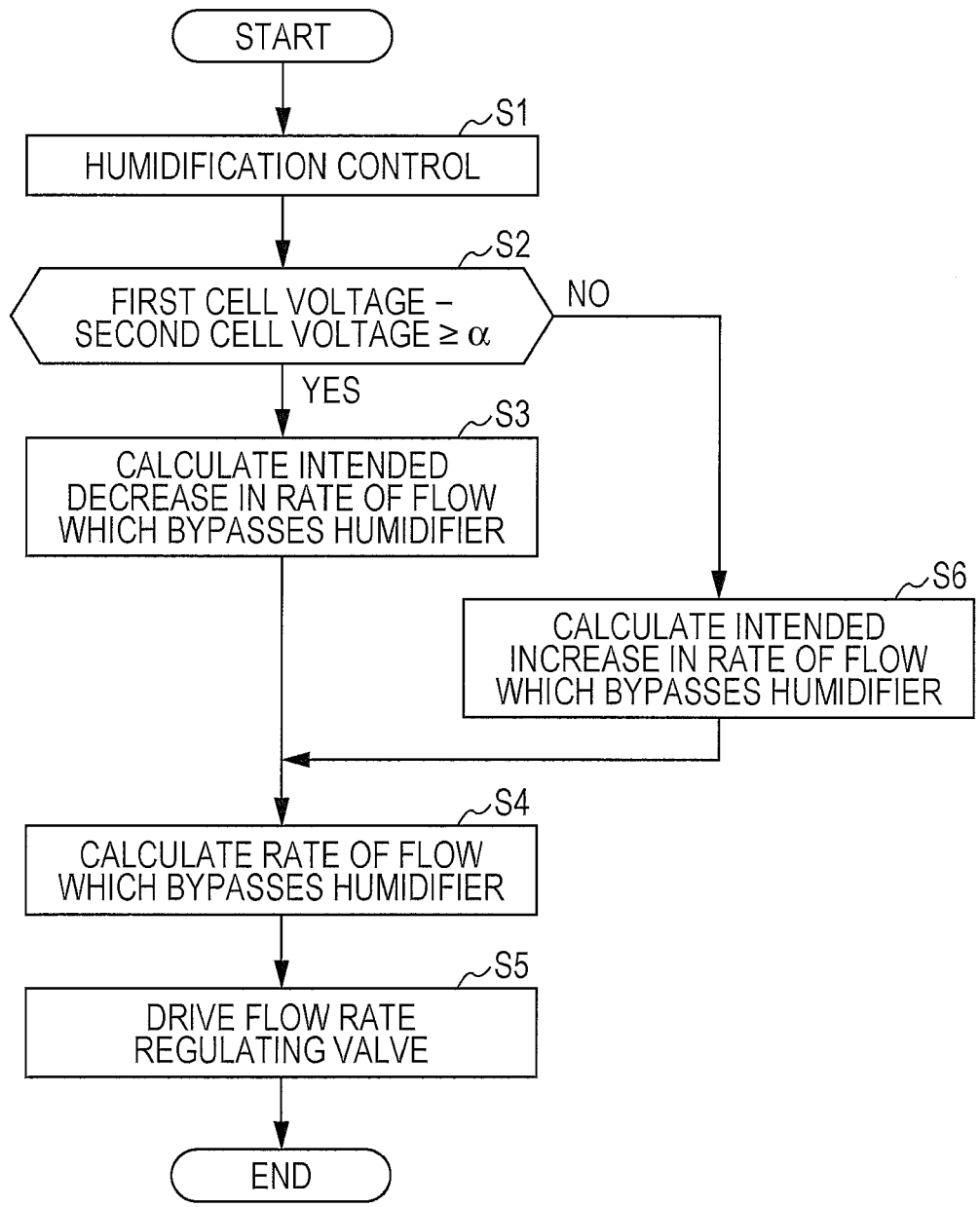
FIG. 3 is a flowchart illustrating the operating method.

In the following, the operating method according to the first embodiment will be described with reference to the flowchart illustrated in FIG. 3. In the first embodiment, humidity is adjusted by controlling the rate of flow which bypasses the humidifier 70 provided in the air supply passage (oxidant gas supply passage) 68 for supplying an oxidant gas to the fuel cell 10, the oxidant gas being one of reactant gases.

First, the controller 20 starts humidification control of the fuel cell system 12 (step S1). In the fuel cell 10, a low load operation with approximately 15% or less of rated output is performed, and the controller 20 detects the output voltages of the first unit cell 31a and the second unit cell 31b with predetermined time intervals. This is because when the output exceeds 15% of the rated output, the difference between the voltages of the first unit cell 31a and the second unit cell 31b is reduced, and thus detection of the difference is difficult.

Then, the difference between the detected voltage (hereinafter referred to as a first cell voltage) of the first unit cell 31a and the detected voltage (hereinafter referred to as a second cell voltage) of the second unit cell 31b is detected. The controller 20 determines whether or not the voltage difference between the first cell voltage and the second cell voltage exceeds a predetermined range α (step S2).

Here, as illustrated in FIG. 2, in the first unit cell 31a, the back side of the second oxidant gas passage 54 is provided with the cooling medium passage 48, and in the second unit cell 31b, the back side of the first oxidant gas passage 50 is provided with the first fuel gas passage 46. That is to say, in the second unit cell 31b, the back side of the first oxidant gas passage 50 is not provided with a cooling medium passage, and thus the second unit cell 31b has less heat dissipation (cooling) than the first unit cell 31a.

Figure 4:
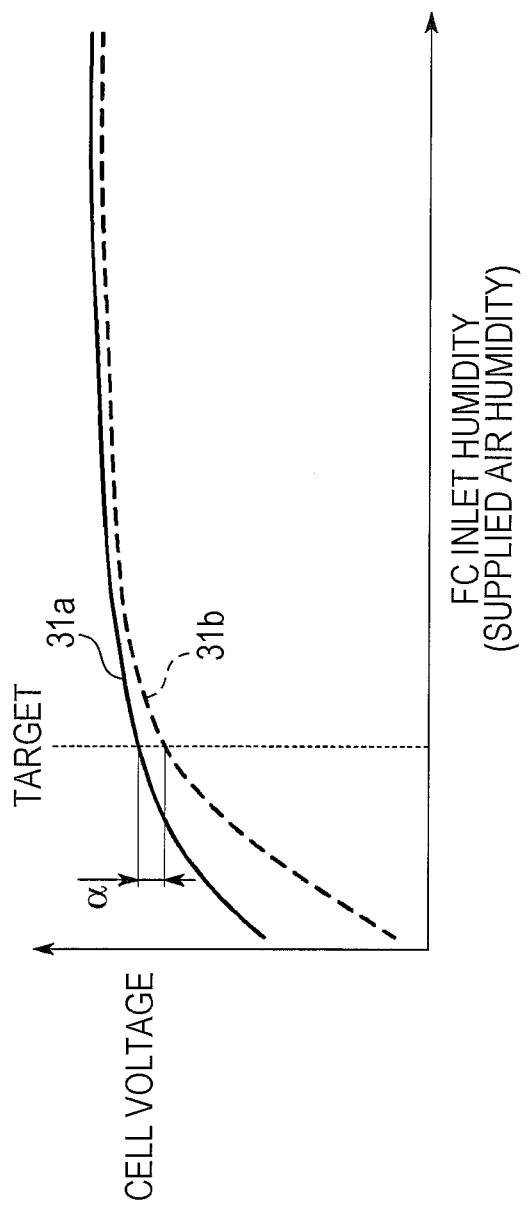
FIG. 4 is a graph illustrating the relationships between the humidities of a first unit cell and a second unit cell, and respective cell voltages.

For this reason, as illustrated in FIG. 4, when the inlet humidity (supplied air humidity) of the fuel cell (FC) decreases, the membrane of the second unit cell 31b is further dried. Therefore, the output voltage (the second cell voltage) of the second unit cell 31b decreases significantly more than the output voltage (the first cell voltage) of the first unit cell 31a. On the other hand, when the membrane of the second unit cell 31b is further humidified rather than dried, the output performance is improved, however, the durability is likely to be reduced.

Thus, in order to perform humidification control so as to achieve improvement in both the durability and the output performance, the difference between the voltages of the first unit cell 31a and the second unit cell 31b is set within the predetermined range α. When the voltage difference exceeds the range α, humidification control is performed.

The fuel cell 10 includes a plurality of first unit cells 31a and second unit cells 31b. For this reason, the average value of the respective first cell voltages and the average value of the respective second cell voltages may be used. In the fuel cell 10, the first unit cells 31a and the second unit cells 31b in the central portion in the cell stacking direction are preferably used for finding the average values.

When the difference between the voltages of the first unit cell 31a and the second unit cell 31b is determined to exceed the predetermined range α (YES in step S2), the process proceeds to step S3. In step S3, an intended decrease in the flow rate of air which bypasses the humidifier 70 is calculated.

Further in step S4, the flow rate of air which bypasses the humidifier 70 is calculated, an opening degree of the flow rate regulating valve 74 is calculated, and the flow rate regulating valve 74 is driven (step S5).

Thus, the flow rate of air supplied to the humidifier 70 is increased, and the amount of water content introduced into the oxidant gas inlet communication hole 40a of the fuel cell 10 is increased. Consequently, in the fuel cell 10, more humidified air is supplied to the first oxidant gas passage 50 and the second oxidant gas passage 54 which constitute each cell unit 22, and thus the first membrane electrode assembly 26a and the second membrane electrode assembly 26b can be humidified.

Thus, the second unit cell 31b, which is particularly likely to be dried, can be favorably humidified, and thus the effect is obtained that reduction in the output of the second unit cell 31b can be prevented.

On the other hand, when the difference between the voltages of the first unit cell 31a and the second unit cell 31b is determined to fall within the predetermined range α (NO in step S2), the process proceeds to step S6. In step S6, an intended increase in the flow rate of air which bypasses the humidifier 70 is calculated. Further in step S4, the flow rate of air which bypasses the humidifier 70 is calculated, an opening degree of the flow rate regulating valve 74 is calculated, and the flow rate regulating valve 74 is driven (step S5).

Thus, the flow rate of air supplied to the humidifier 70 is decreased, and the amount of water content introduced into the oxidant gas inlet communication hole 40a of the fuel cell 10 is decreased. Consequently, in the fuel cell 10, less humidified air is supplied to the first oxidant gas passage 50 and the second oxidant gas passage 54 which constitute each cell unit 22, and thus the first membrane electrode assembly 26a and the second membrane electrode assembly 26b can be dehumidified. Thus, the first unit cell 31a whose membrane is particularly likely to be humidified has reduced humidity, so that the durability can be maintained.

Consequently, in the first embodiment, drying of membrane and excess humidification of membrane can be prevented as much as possible in a simple step, and thus the effect is obtained that the output performance and durability of the entire fuel cell 10 can be maintained in a favorable condition.

Figure 5:
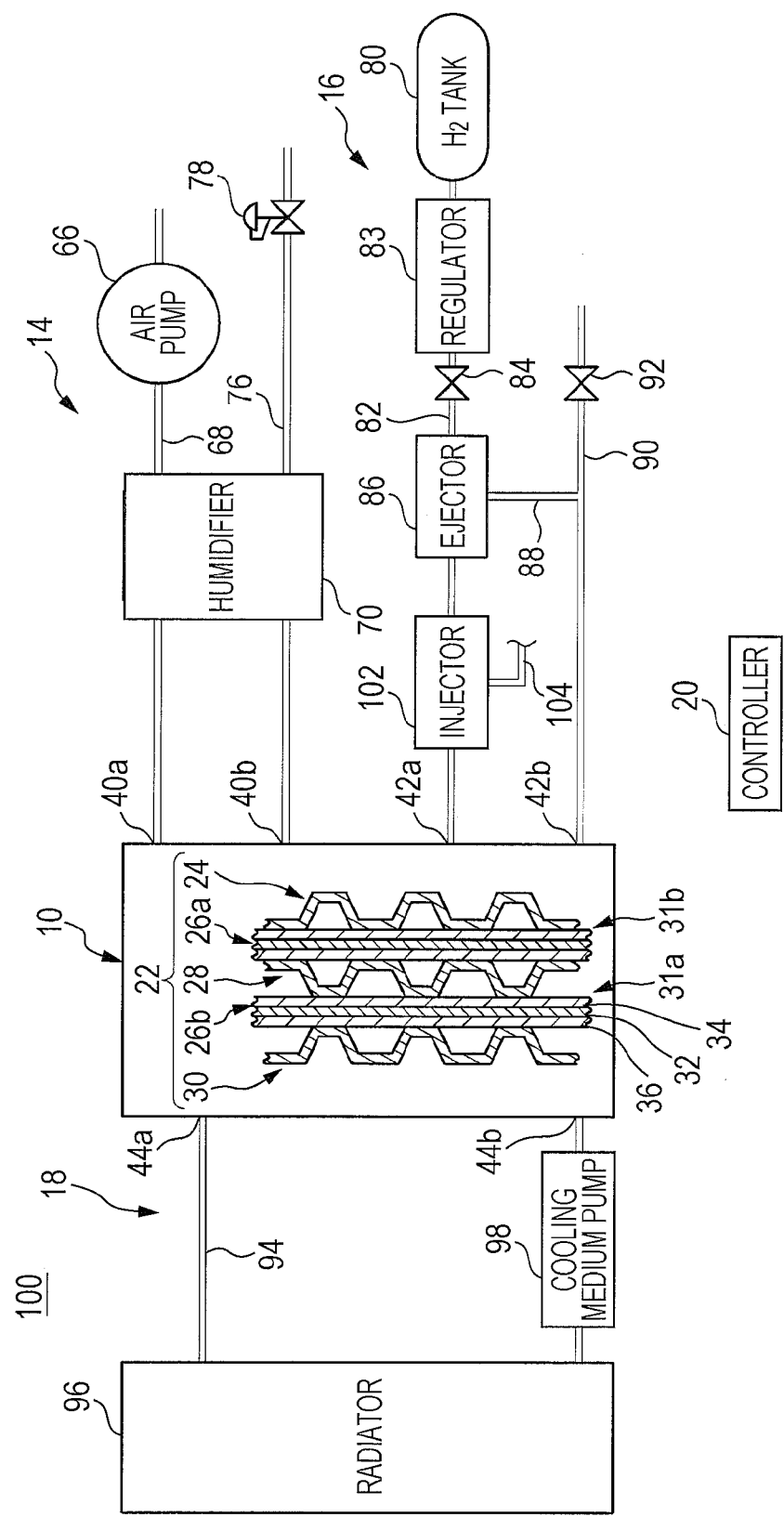
FIG. 5 is a schematic configuration diagram of a fuel cell system to which an operating method according to a second embodiment of the present disclosure is applied.

FIG. 5 is a schematic configuration diagram of a fuel cell system 100 to which an operating method according to a second embodiment of the present disclosure is applied. The same components as those of the fuel cell system 12 according to the first embodiment are labeled with the same reference symbols, and detailed description thereof will be omitted.

The fuel cell system 100 includes, for example, an injector 102 instead of the bypass passage 72 and the flow rate regulating valve 74, the injector 102 being a water supplying device which is disposed in the hydrogen supply passage 82 upstream of the ejector 86. The injector 102 is connected to a water supply passage 104 which allows water for humidification to be supplied to hydrogen gas which circulates through the hydrogen supply passage 82. It is to be noted that liquid water, which is obtained by capturing the water content in the hydrogen circulation passage 88 using a gas-liquid separator (not illustrated), may be used, or pure water may be supplied from the outside.

In the thus configured fuel cell system 100, the operating method according to the second embodiment of the present disclosure is performed in accordance with the flowchart illustrated in FIG. 6. In the second embodiment, humidity is adjusted by supplying water content to the hydrogen supply passage (fuel gas supply passage) 82 which allows hydrogen gas to be supplied to the fuel cell 10, the hydrogen gas being the other of the reactant gases.

First, a low load operation of the fuel cell 10 is performed so as to start humidification control (step S101). When the difference between the voltages of the first unit cell 31a and the second unit cell 31b is determined to exceed the predetermined range α (YES in step S102), the process proceeds to step S103. In step S103, an intended increase in the amount of water for humidifying the hydrogen gas which circulates through the hydrogen supply passage 82 is calculated.

Further in step S4, the amount of water for humidifying the hydrogen gas is calculated. An opening degree of the injector 102 is calculated according to the calculated amount of water for the humidification, and the injector 102 is driven (step S105). Thus, the hydrogen gas which circulates through the hydrogen supply passage 82 is humidified, and the humidified hydrogen gas is supplied to the first fuel gas passage 46 and the second fuel gas passage 52 which constitute each cell unit 22. Consequently, the first membrane electrode assembly 26a and the second membrane electrode assembly 26b can be humidified by more humidified hydrogen gas.

On the other hand, when the difference between the voltages of the first unit cell 31a and the second unit cell 31b is determined to fall within the predetermined range α (NO in step S102), the process proceeds to step S106. In step S106, an intended decrease in the amount of water for humidifying the hydrogen gas which circulates through the hydrogen supply passage 82 is calculated.

Further in step S104, the amount of water for humidifying the hydrogen gas is calculated. An opening degree of the injector 102 is calculated according to the calculated amount of water for the humidification, and the injector 102 is driven (step S105).

Accordingly, the amount of water for humidifying the hydrogen gas which circulates through the hydrogen supply passage 82 is decreased, and less humidified hydrogen gas is supplied to the first fuel gas passage 46 and the second fuel gas passage 52 which constitute each cell unit 22. Thus, the first membrane electrode assembly 26a and the second membrane electrode assembly 26b can be dehumidified by the less humidified hydrogen gas.

Consequently, in the second embodiment, drying of membrane and excess humidification of membrane can be prevented as much as possible in a simple step, and thus the same effect as that of the above-described first embodiment is obtained that the output performance and durability of the entire fuel cell 10 can be maintained in a favorable condition.

In the operating method according to a third embodiment of the present disclosure, PID based feedback control of the amount of humidification is performed while determining whether or not the difference between the voltages of the first unit cell 31a and the second unit cell 31b exceeds the predetermined range α.

Here, PID based control is a control in which humidity adjustment is performed by combining each element of proportional control (P), integral control (I), and derivative control (D), thereby converging the difference between the voltages of the first unit cell 31a and the second unit cell 31b into a certain predetermined range.

Consequently, in the third embodiment, drying of membrane and excess humidification of membrane can be prevented as much as possible in a simple step, and thus the same effect as those of the above-described first and second embodiments is obtained, i.e., the output performance and durability of the entire fuel cell 10 can be maintained in a favorable condition.

The embodiment of the present disclosure relates to a method of operating a fuel cell which includes: a first membrane electrode assembly and a second membrane electrode assembly which are each formed by providing electrodes on respective sides of an electrolyte membrane; a first separator which is adjacent to the first membrane electrode assembly, and in which a first reactant gas passage for supplying one reactant gas to one electrode of the first membrane electrode assembly is formed; a second separator which is disposed between the first membrane electrode assembly and the second membrane electrode assembly, and in which a second reactant gas passage for supplying the other reactant gas to the other electrode of the first membrane electrode assembly, and a third reactant gas passage for supplying the one reactant gas to one electrode of the second membrane electrode assembly are formed; and a third separator which is adjacent to the second membrane electrode assembly, and in which a fourth reactant gas passage for supplying the other reactant gas to the other electrode of the second membrane electrode assembly, and a cooling medium passage for supplying a cooling medium between the adjacent first separator and the third separator are formed.

The operating method according to the embodiment includes: detecting a difference between voltage of a first unit cell including the first membrane electrode assembly and voltage of a second unit cell including the second membrane electrode assembly; and adjusting humidity of the one reactant gas before supplying to the first reactant gas passage or adjusting humidity of the other reactant gas before supplying to the second reactant gas passage when the detected difference between the voltages is determined to be out of a predetermined range. Thus, for example, when the second membrane electrode assembly is dried and has a reduced output, the detected voltage difference exceeds a predetermined range (becomes out of range). Therefore, a drying state of the electrolyte membrane is easily detected, and reduction in output can be prevented by adjusting the humidity of one reactant gas or the other reactant gas to a higher level. Consequently, the electrolyte membrane of each unit cell can be prevented from being dried as much as possible in a simple step, and the output performance of the entire fuel cell can be maintained in a favorable condition.

Preferably, in the operating method according to the embodiment, the fuel cell includes an oxidant gas supply passage for supplying an oxidant gas as the one reactant gas to the fuel cell, the oxidant gas supply passage being provided with a humidifier, a bypass passage which bypasses the humidifier, and the humidity is adjusted by controlling a bypass amount of the oxidant gas which bypasses the humidifier.

Preferably, in the operating method according to the embodiment, the fuel cell includes a fuel gas supply passage for supplying a fuel gas as the other reactant gas to the fuel cell, and the humidity is adjusted by supplying a water to the fuel gas supply passage.

Preferably, in the operating method according to the embodiment, the humidity is adjusted when a low load operation with approximately 15% or less of rated output is performed.

Obviously, numerous modifications and variations of the present invention are possible in light of the above teachings. It is therefore to be understood that within the scope of the appended claims, the invention may be practiced otherwise than as specifically described herein.

What is claimed is:

1. A method of operating a fuel cell, comprising:
   detecting a first voltage of a first unit cell and a second voltage of a second unit cell, the first unit cell including a first membrane electrode assembly having a first electrolyte membrane and first electrodes provided on respective sides of the first electrolyte membrane, the second unit cell including a second membrane electrode assembly having a second electrolyte membrane and second electrodes provided on respective sides of the second electrolyte membrane;
   detecting a voltage difference between the first voltage and the second voltage;
   determining whether the voltage difference is out of a predetermined range; and
   adjusting, when the voltage difference is determined to be out of the predetermined range,
      humidity of a first reactant gas before being supplied to a first reactant gas passage which is provided in a first separator and through which the first reactant gas is to be supplied to one of the first electrodes, or
      humidity of a second reactant gas before being supplied to a second reactant gas passage which is provided in a second separator and through which the second reactant gas is to be supplied to another of the first electrodes.

2. The method of operating of a fuel cell according to claim 1,
   wherein the first reactant gas includes an oxidant gas,
   wherein the fuel cell includes
      an oxidant gas supply passage through which the oxidant gas is to be supplied to the fuel cell,
      a humidifier provided in the oxidant gas supply passage, and
      a bypass passage to bypass the humidifier, and
   wherein the adjusting of the humidity includes controlling a bypass amount of the oxidant gas which bypasses the humidifier through the bypass passage.

3. The method of operating of a fuel cell according to claim 1,
   wherein the second reactant gas includes a fuel gas,
   wherein the fuel cell includes a fuel gas supply passage through which the fuel gas is to be supplied to the fuel cell, and
   wherein the adjusting of the humidity includes supplying water to the fuel gas supply passage.

4. The method of operating of a fuel cell according to claim 1,
   wherein the adjusting of the humidity includes adjusting the humidity at a low load with approximately 15% or less of rated output.

5. The method of operating of a fuel cell according to claim 1,
   wherein the second separator includes a third reactant gas passage through which the first reactant gas is to be supplied to one of the second electrodes of the second membrane electrode assembly, and
   wherein the fuel cell includes a third separator adjacent to the second membrane electrode assembly and including
      a fourth reactant gas passage through which the second reactant gas is to be supplied to another of the second electrodes of the second membrane electrode assembly, and
      a cooling medium passage through which a cooling medium is to be supplied between the third separator and the first separator.

6. The method of operating of a fuel cell according to claim 1,
   wherein the first separator is adjacent to the first membrane electrode assembly, and
   wherein the second separator is disposed between the first membrane electrode assembly and the second membrane electrode assembly.

7. The method of operating a fuel cell according to claim 1, further comprising calculating, when the voltage difference is determined to be within the predetermined range,
   an intended increase in a rate of flow which bypasses a humidifier provided in the oxidant gas supply passage, or
   an intended decrease in an amount of water for humidifying the second reactant gas.

8. The method of operating a fuel cell according to claim 1, wherein the detecting the first voltage of the first unit cell comprises detecting a first average voltage value for a plurality of first unit cells, and the detecting the second voltage of the second unit cell comprises detecting a second average voltage value for a plurality of second unit cells.

9. The method of operating a fuel cell according to claim 1, wherein the first unit cell and the second unit cell from which the respective first voltage and second voltage are detected are disposed in a central portion of the fuel cell in a cell stacking direction of the fuel cell.

10. The method of operating a fuel cell according to claim 1,
    wherein the second separator includes a third reactant gas passage through which the first reactant gas is to be supplied to one of the second electrodes of the second membrane electrode assembly, and
    wherein the fuel cell includes a third separator adjacent to the second membrane electrode assembly including a cooling medium passage through which a cooling medium is to be supplied between the third separator and the first separator.

* * * * *